United States Patent [19]

Young

[11] Patent Number: 4,700,873

[45] Date of Patent: Oct. 20, 1987

[54] THREE-TIRED VEHICLE CARRIER

[76] Inventor: William A. Young, 501 E. St. Louis St., West Frankfort, Ill. 62896

[21] Appl. No.: 498,720

[22] Filed: May 27, 1983

[51] Int. Cl.⁴ .............................................. B60R 9/00
[52] U.S. Cl. .................................. 224/42.07; 224/324
[58] Field of Search ............... 224/309, 273, 42.03 R, 224/42.03 A, 42.03 B, 42.06, 42.07, 329, 42.43, 42.46 R, 42.45 R; 414/462, 463, 464, 465, 466

[56] References Cited

U.S. PATENT DOCUMENTS

| | | | |
|---|---|---|---|
| 3,612,366 | 10/1971 | Schneider | 414/462 X |
| 3,659,762 | 5/1972 | Kravitz | 224/42.03 B |
| 3,720,358 | 3/1973 | McIntire | 224/329 X |
| 3,796,333 | 3/1974 | Goldstein | 224/42.03 B X |
| 3,827,589 | 8/1974 | Townsend, Jr. | 414/462 |
| 4,275,981 | 6/1981 | Bruhn | 224/42.03 B X |
| 4,345,705 | 8/1982 | Graber | 224/42.03 B |
| 4,431,205 | 2/1984 | Speicher et al. | 224/42.03 B X |

Primary Examiner—Henry J. Recla
Assistant Examiner—Robert M. Petrik
Attorney, Agent, or Firm—Warren D. Flackbert

[57] ABSTRACT

A three-wheeled vehicle carrier defined by framework selectively secured to the rear end of a carrying vehicle, such as a conventional automobile, in an overlying relationship with respect to the trunk of the latter. The carrier is positively placed, largely due to the gravitational weight of the three-wheeled vehicle on the rear portion of the framework, where additional positioning straps, as around the front axle of the three-wheeled vehicle and around the pedals/pedal axles of the latter serve further auxiliary placement purposes. The carrier affords a convenience not available heretofore in three-wheeled vehicle transporting, i.e. obviates the necessity of using either a separate and/or specialized wheeled carrying unit/vehicle.

5 Claims, 3 Drawing Figures

U.S. Patent  Oct. 20, 1987  4,700,873
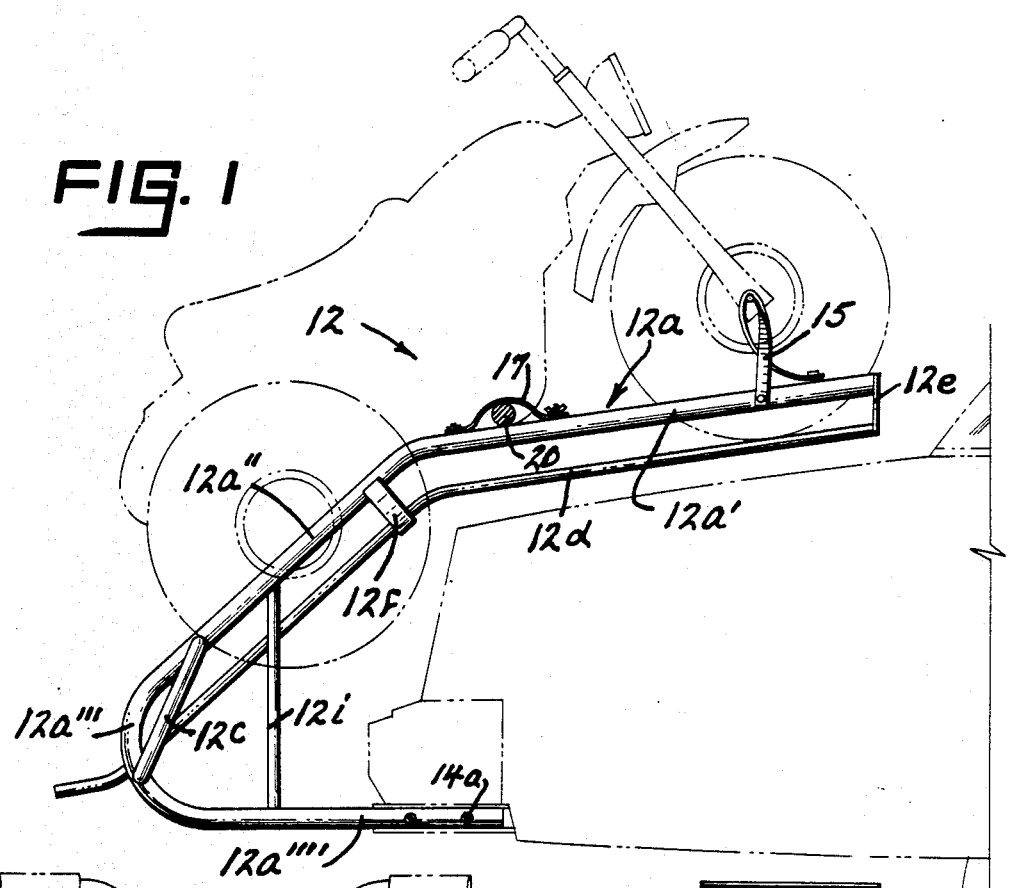
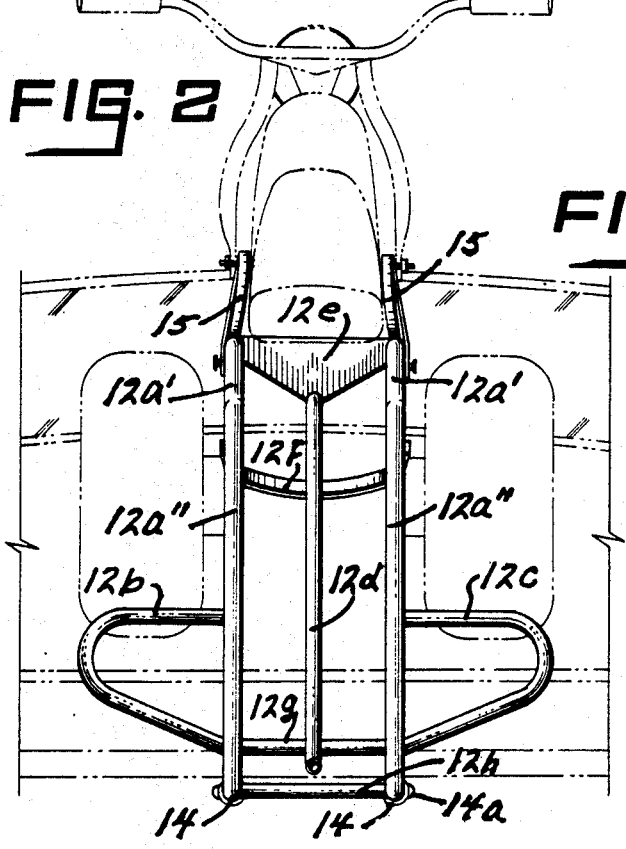
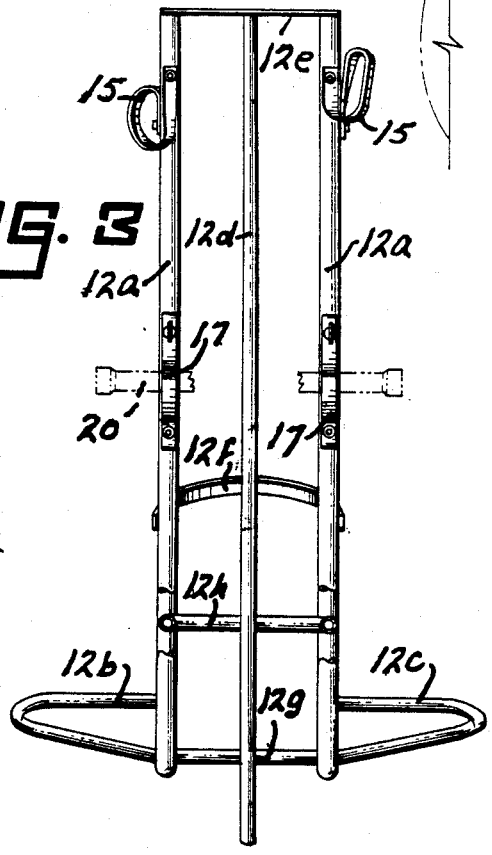

THREE-TIRED VEHICLE CARRIER

As is known, three-wheeled vehicles, such as those used for recreational purposes, oftentimes present problems in transporting from one site or location of use to another, particularly in the instance where a public roadway is involved, i.e. the need to satisfy governmental licensing and traffic regulations. Customarily, transporting of the three-wheeled vehicle has been achieved by means of a trailer unit pulled by another vehicle; the placement of the three-wheeled vehicle within a station wagon, van or the like, presenting awkward loading and/or securing problems; and, by strapping or otherwise maintaining such onto the bed of a pickup truck. Thus, in each of the preceding instances, the three-wheeled vehicle user was required to have access to a specialized type of transporting unit, i.e. other than a standard automobile used by most households.

The invention overcomes the inherent problem of three-wheel vehicle transporting by the provision of specialized carrier framework adapted to be selectively mounted onto the chassis of the carrying vehicle. In other words, the aforesaid framework is compatible with and used in conjunction with a commercially available automobile, overlying the rear deck or the trunk compartment and releasably secured onto the frame in the general area beneath the rear bumper.

The carrier of the invention is arranged to readily receive a three-wheeled vehicle, where positive placement of the latter is assured by reason of the weight of the three-wheeled vehicle at its rear or two-wheeled end, i.e. the rear wheels bear against portions of the framework. Additional positive transporting assurance is typically achieved by pairs of belts, one pair overlying and securing the front axle of the three-wheeled vehicle and the other pair overlying the foot pedals, or the axles carrying the foot pedals, of the latter.

In other words, and restated simply, the invention affords the ready transporting of a three-wheeled vehicle on a conventional automobile by means of a simple selectively releasable framework, with placement being assured largely through weight distribution and the use of auxiliary securing straps, if deemed necessary. Thus, the three-wheel vehicle user is not required to expend unnecessary funds for a separate trailer for carrying purposes nor, on the other hand, the need to purchase a van or station wagon to implement an existing household automobile. In other words, the three-wheeled vehicle is economically carried to a desired location, together, i.e. at the same time, with the individuals desiring to benefit from the pleasure and/or utility of its use.

A better understanding of the present invention will become more apparent from the following description, taken in conjunction with the accompanying drawing, wherein FIG. 1 is a view in side elevation showing a three-wheeled vehicle carrier in accordance with the teachings of the present invention;

FIG. 2 is a view in end elevation, looking from left to right in FIG. 1, showing certain details of the instant three-wheeled vehicle carrier; and, FIG. 3 is a top plan view further detailing the presented carrier, looking downwardly upon FIG. 1.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the three-wheeled vehicle carrier of the invention is characterized as a rigid framework 12 defined, typically, by generally parallel elongated base frame rods or members 12a, each represented by portions 12a', 12a'', 12a''' and 12a'''' presenting straight or curved segments all blending together into an integral finished component. As evident in FIG. 1, the base frame members 12a, particularly portions 12a' thereof, overlie the deck or trunk lid, in a spaced apart relationship, at the rear of a standard automobile (shown in phantom).

The portions 12a'', which extend rearwardly and downwardly from portions 12a', blend into curved portions 12a''', where, in turn, the latter blend into portions 12a'''' lying in a generally horizontal plane. The free ends of portions 12a'''' are typically adapted to extend into sleeves 14 (see FIG. 2), or any other form of securing arrangement, disposed on the frame of the automobile chassis, and with the use of selectively removable pins, bolts or the like 14a cooperating with openings therein (not shown), serve to positively position the base frame rods or members 12a of the framework 12 of the carrier.

In order to adapt to any particular securing arrangement, the free ends of the portions 12a'''' may be modified, if necessary, to satisfy deck proportioning needs. The latter may be accomplished by cutting; by adding more openings or holes for the aforesaid pins, bolts or the like 14a; or by the provision of perforations defining a rod break-off line, to achieve the desired length, depending on the geometry of the rear deck of the automobile. It should be noted that the framework 12 is mostly a combination of tubular metal sections.

In any event, the framework 12 of the carrier further includes laterally extending curved members 12b and 12c, i.e. extending outwardly from the elongated base frame rods or members 12a. Importantly, the latter serve a blocking relationship with respect to the rear wheels of the three-wheeled vehicle (see FIGS. 1 and 2). In other words, when the three-wheeled vehicle is positioned on the carrier, in a cradling relationship, the greatest amount of its weight is in engagement with the aforesaid lateral members 12b and 12c.

The assembly of the carrier further includes a longitudinally extending spinelike reinforcing member 12d interconnected with base frame rods or members 12a by a reinforcing plate 12e (against which the front wheel of the three-wheeled vehicle may abut) and reinforcing members 12f, 12g, and 12h. As evident in FIG. 1, generally vertical reinforcing members 12i extend between portions 12a'' and 12a'''' of each of the base frame members 12a. Thus, the overall unit affords a rigid and structurally sound assembly for bearing the weight of the three-wheeled vehicle.

In order to further assure positioning during transporting, tie straps 15 are provided on each of the base frame members 12a proximate the forward end of such, serving, as evident in FIGS. 1 and 2, to be positioned over and around the front axle of the three-wheeled vehicle. Snap action or other type of fastening is employed to achieve the aforesaid positive front wheel axle placement.

On the other hand, and in order to even further position the three-wheeled vehicle on the carrier, auxiliary tie straps 17 are secured to each of the base frame members 12a, where, in this instance, however, each of such are adapted to overlie either a pedal 20 (or an axle for the pedal) of the three-wheeled vehicle. As in the instance of tie straps 15, tie straps 17 are snapped or otherwise secured into an operative position.

From the preceding, it should be apparent that the invention affords a reliable approach for transporting a three-wheeled vehicle on a standard or conventional automobile, such being removably secured to the undersurface of the chassis of the automobile and disposed in an overlying spaced apart relationship with respect to the rear deck or trunk lid of the automobile. Positive placement is secured by reason of blocking action or engagement by the rear wheels of the three-wheeled vehicle with the laterally extending curved members 12b and 12c on the rigid framework 12 and, as well, the employment of the independent security tie straps 15 and 17.

As stated, the front wheel of the three-wheeled vehicle generally abuts plate 12e in a vehicle transporting position. Thus, the invention permits the usage of an available automobile for three-wheeled vehicle transporting without the necessity of purchasing or otherwise having made available an independent unit, as a trailer; a van; a station wagon; a pickup truck; or, the like.

The three-wheeled vehicle carrier described above is susceptible to various changes within the spirit of the invention as, for example, proportioning; the number and position of reinforcing members; the shape of the lateral projecting members; the type of auxiliary fastening employed in connection with the front axle and the pedals (or the axles for the pedals); the possible use of cushioning or other resilient material on the undersurface of the framework 12 above the automobile body; and, the like. Thus, the preceding should be considered illustrative and not as limiting the scope of the following claims.

I claim:

1. A three-tired vehicle carrier comprising, in combination with the rear deck of an automobile having a chassis, a framework mounting said three-tired vehicle in a transporting position including a first portion selectively and releasably secured to the undersurface of said chassis of said automobile and a second portion overlying said rear deck of said automobile in a spaced apart relationship, said framework being defined by longitudinally disposed frame members in a receiving trough relationship with the front tire of said three-tired vehicle and including a member interconnecting said frame members in a selectively abutting relationship with said front tire, and lateral members extending outwardly from both sides of said frame members adapted to receive the rear tires of said three-tired vehicle in a movement blocking relationship, whereby said arrangement serves to stabilize said three-tired vehicle in said transporting position.

2. The three-tired vehicle carrier of claim 1 where said framework includes auxiliary means selectively securing portions of said three-tired vehicle in said transporting position.

3. The three-tired vehicle carrier of claim 1 where portions of said frame members defining said second portion are inclined rearwardly and downwardly, blending into said first portion secured to said undersurface of said chassis.

4. The three-tired vehicle carrier of claim 2 where said fastening means are straps.

5. The three-tired vehicle carrier of claim 1 where pin means selectively and releasably secure said first portion of said framework to said undersurface of said chassis.

* * * * *